June 26, 1934.  E. G. HILL  1,964,693
MOTOR VEHICLE CLUTCH CONTROL MECHANISM
Filed Dec. 29, 1933  2 Sheets-Sheet 2
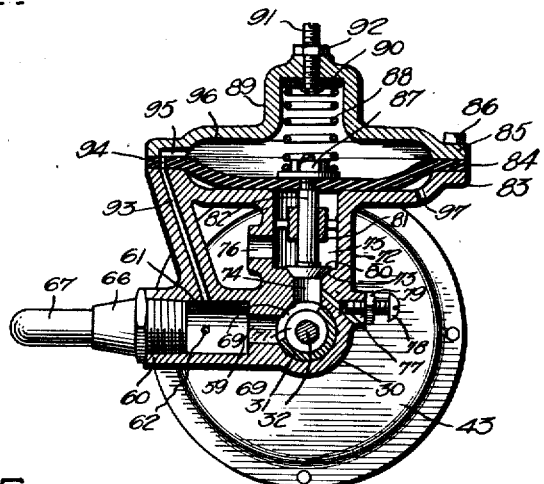
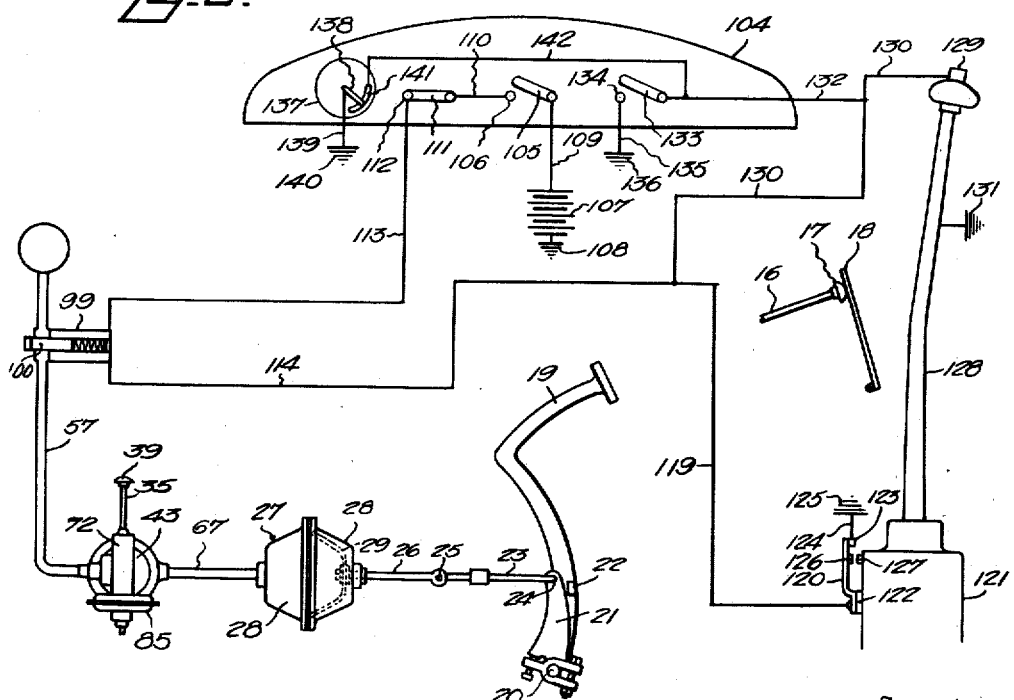
Inventor
EDWARD G. HILL Patented June 26, 1934

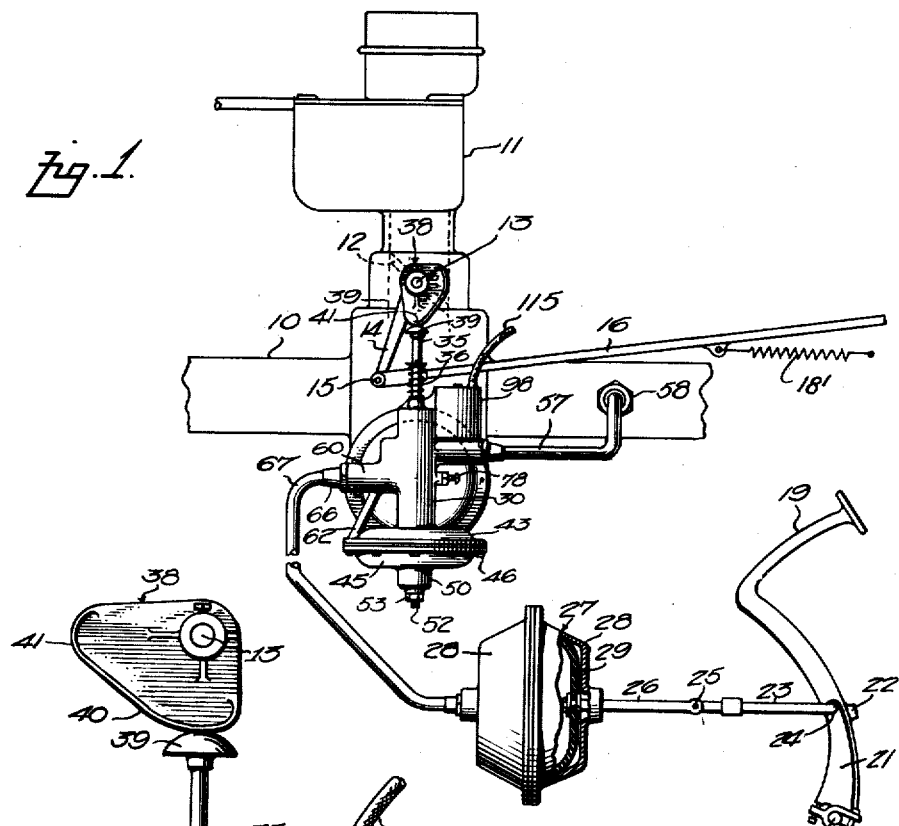

1,964,693

UNITED STATES PATENT OFFICE

1,964,693

MOTOR VEHICLE CLUTCH CONTROL MECHANISM

Edward G. Hill, Chicago, Ill., assignor to Hill Engineering Corporation, Richmond, Va., a corporation of Virginia Application December 29, 1933, Serial No. 704,563

23 Claims. (Cl. 192—.01)

This invention relates to motor vehicle clutch control mechanism, and more particularly to a mechanism for automatically operating the clutch of a motor vehicle without any conscious effort on the part of the operator.

For several years, the development of automatic devices for operating motor vehicle clutches has gone through numerous stages toward the end of providing a mechanism which will operate the motor vehicle clutch in a manner simulating skillful manual control as practiced under varying conditions. In the early stage of the development of such devices, it was appreciated that it would be impracticable to permit the clutch elements to return slowly into engagement throughout their range of movement in view of the time which would be required for such movement. Accordingly, it was proposed to provide means for releasing the clutch elements substantially completely from the fully disengaged position to permit relatively rapid movement thereof, and then to check the movement of the clutch elements substantially at the point of initial engagement thereof. In the earlier devices, this idea was carried out in conjunction with means for permitting a relatively slow fixed rate of movement of the clutch elements from the point of initial engagement into complete operative engagement.

Subsequently, means were provided for permitting a variable rate of movement of the clutch elements into operative engagement in accordance with the operating conditions of the motor vehicle, and in the prior patent of Edward G. Hill and Henry W. Hey, No. 1,881,188, granted October 4, 1932, the rate of movement of the accelerator pedal in proportion to the engine speed was utilized for governing the rate of movement of the clutch elements after they passed the point at which they were initially checked. Various means were employed for effecting the checking action, and in the earlier forms of these devices, adjustable means were provided for checking the clutch elements in accordance with predetermined distance of movement of the clutch elements toward operative engagement, the adjustable means being so arranged as to cause the checking action to occur substantially at the point of initial engagement of the clutch elements. The various forms of means for checking the movement of the clutch elements substantially at the point of initial engagement were operative in conjunction with various forms of means for governing the rate of movement of the clutch elements after they pass the point of initial engagement.

The combinations referred to provided fairly accurate operation, considering the obstacles and problems to be overcome in simulating conventional clutch operation. One of the greatest difficulties involved was in the provision of means which would check the movement of the clutch elements accurately with respect to the point of initial engagement of the clutch elements, and it was found that the forms of devices which depended upon checking the movement of the clutch elements in accordance with predetermined distance of travel were unsatisfactory since a given adjustment of the checking means would be accurate at the time adjustment was made, but would soon lose its accuracy of adjustment, thus resulting in rough operation of the mechanism and serious wear on the clutch plates. To overcome the difficulty encountered in the various means which had been employed for checking the return movement of the clutch elements at the point of initial engagement, there was developed an apparatus which functioned to provide checking of the return movement of the clutch elements accurately at the point of initial engagement regardless of the predetermined travel of the clutch plates and the elements connected thereto. Such apparatus is disclosed and claimed in the copending application of Edward G. Hill and Henry W. Hey Serial No. 587,578, filed January 19, 1932. Such apparatus depends for its operation upon the initial light contact of the clutch elements to govern a suitable valve mechanism adapted to act promptly to completely stop the movement of the clutch elements at the point of initial engagement subject to further control for determining the rate of movement of the clutch elements into operative engagement by some means such as the means disclosed in prior Patent No. 1,881,188 previously referred to.

In connection with the various types of apparatus referred to, attention is invited to the fact that it previously has been considered essential that the movement of the clutch elements be checked as accurately as possible at the point of initial engagement regardless of varying operating conditions. This is true even through under actual operating conditions it was found that perfectly smooth operation cannot be obtained under varying conditions. For example, the structure shown in the copending application of Hill and Hey, Serial No. 587,578, referred to above, is highly advantageous over any earlier constructions of which I am aware in that it retained its adjustment over indefinite periods of time and the checking of the clutch elements accurately at the point of initial engagement was not affected by different temperature conditions of the clutch facings or by the weather, or by the wearing of the clutch facings. Even with such construction, however, wherein the checking of the clutch elements takes place accurately at the point of initial engagement under all conditions, it was found that the accuracy of skillful manual control could not be obtained under all operating conditions.

As previously stated, the types of clutch control apparatus developed up to the present time were fairly accurate in operation, considering the problems and obstacles to be overcome, and one of these difficulties lay in the fact that it was impossible to secure sufficiently prompt clutch disengagement upon the releasing of the accelerator pedal. For example, assuming that a vehicle is traveling with the engine throttle in half open position and the operator desired to disengage the clutch by releasing the accelerator pedal, either for the purpose of free wheeling or for shifting gears, it was necessary to completely release the accelerator pedal before clutch disengagement would take place. Throughout the range of movement of the throttle from the half open position referred to to the fully idle position, it will be apparent that the vehicle motor will have been progressively decelerated and it is highly desirable that deceleration of the vehicle be prevented.

The tendency of the motor to be decelerated by virtue of the progressive closing of the throttle is transmitted in prior devices to the driving wheels of the vehicle due to the reversal of torque transmitted by the clutch. Obviously, clutch disengagement could not take place until complete releasing of the accelerator pedal took place, at which point a further lagging took place due to the time element required for the releasing of the clutch. This time element is small, but it added its effect to the deceleration of the vehicle occurring during the interval of the releasing of the accelerator pedal, and at each declutching it will be apparent that a quite noticeable and disadvantageous dragging of the vehicle occurred. It will be apparent that it is highly desirable to effect the rapid declutching of the vehicle when desired, and this has been impossible with prior constructions for the reasons indicated.

I have discovered that the checking of the clutch elements cannot take place at exactly the same point under all operating conditions if smooth operation is to be obtained. For example, I have found that the greatest accuracy and smoothness of operation can be obtained when the accelerator pedal is slowly depressed if the clutch elements are checked approximately at the point of initial engagement. On the other hand, I have discovered that when the accelerator pedal is depressed more rapidly, as when the vehicle is in intermediate or high gears, the greatest smoothness and accuracy of operation can be obtained by checking the movement of the clutch elements slightly past the point of initial contact with the clutch plates, the proper point of checking depending upon the rate of operation of the accelerator and occurring progressively later with respect to the point of initial engagement of the clutch plates as the accelerator pedal is more rapidly operated.

It is accordingly an important object of the present invention to provide automatic means for operating a motor vehicle clutch wherein the automatic operation occurs differently under various condition to more accurately simulate skillful conventional clutch operation than has been possible with any prior devices of which I am aware.

A further object is to provide a power device for disengaging the clutch in combination with control means therefor, the control means being operable for checking the movement of the clutch elements intermediate their return movement into engagement with each other at variable points automatically predetermined in accordance with operating conditions.

A further object is to provide an apparatus of the character referred to wherein the control means operates to check the return movement of the clutch elements substantially at or slightly prior to the point of initial engagement when the accelerator is operated slowly from idling position, and to check the return movement of the clutch elements slightly later if the accelerator pedal is operated more rapidly.

A further object is to provide a differential pressure power device for operating a motor vehicle clutch, in conjunction with control valve means therefor which operates to connect the power device to the atmosphere to permit initial return movement toward engaged position and then disconnects the power device from the atmosphere to check the movement of the clutch elements during their return movement, the valve means operating to effect the checking action progressively later in the return movement of the clutch elements upon the progressively more rapid operation of the accelerator pedal.

A further object is to provide an apparatus of the character referred to wherein the valve means includes a valve operable in accordance with varying engine conditions, and a second valve operative by the power device in conjunction with the first named valve for checking the movement of the clutch elements during their return movement, the movement of the first named valve being such as to cause the second valve to move a greater distance in a consequently slightly greater length of time before the clutch elements are checked when the accelerator pedal is pressed more rapidly to secure greater engine acceleration.

A further object is to provide a pair of valves operating in conjunction with each other to control both the checking of the clutch elements during their return movement toward operative engagement and the rate of movement of the clutch elements into operative engagement after their movement has been checked.

A further object is to provide means operating in conjunction with the valve means referred to for preventing the checking of the clutch elements from occurring sufficiently late to cause any jerking or lunging of the vehicle.

A further object is to provide a valve mechanism of the character referred to which includes an integral connection to a source of differential pressure, and to provide a valve in said connection normally biased to closed position to prevent automatic clutch operation, and provided with solenoid means forming, in effect, an integral part of the valve mechanism and adapted to open the connection to the source of differential pressure either automatically or manually.

A further object is to provide an automatic clutch operating mechanism wherein declutching occurs promptly upon the releasing of the accelerator pedal to prevent the dragging of the vehicle in the manner which takes place with present types of clutch control apparatus.

A further object is to provide a clutch control mechanism which functions automatically to prepare the clutch for disengagement prior to movement of the accelerator to the fully idle position so that clutch disengagement takes place more rapidly when such accelerator position is reached to eliminate the dragging or deceleration of the vehicle at each releasing of the accelerator pedal.

A further object is to provide a control mechanism for clutches which is operative in conjunction with the accelerator pedal in such a manner that a substantial movement of the accelerator toward idle position progressively releases the clutch plate pressure to prepare for complete clutch disengagement when the idling position of the throttle is reached, without permitting the slipping of the clutch.

A further object is to provide an apparatus of the character referred to which operates during movement of the throttle toward idling position to reduce the clutch plate pressure substantially in proportion to the engine torque to prepare the clutch for instantaneous disengagement upon the movement of the accelerator to the fully idle position.

A further object is to provide a valve mechanism operative for accomplishing the desired results referred to and wherein the valve mechanism is extremely simple in construction and economical to manufacture, and which is remarkably accurate in operation without the necessity of being frequently adjusted.

Other objects and advantages of the invention will become apparent during the course of the following description.

In the drawings I have shown one embodiment of the invention. In this showing,

Figure 1 is a side elevation of the apparatus shown in position with respect to certain of the parts of the motor vehicle engine and associated elements, Figure 2 is a central vertical sectional view through the main valve cylinder looking in the same direction as Figure 1, Figure 3 is a detail section on line 3—3 of Figure 2, Figure 4 is a section on line 4—4 of Figure 2, and, Figure 5 is a diagrammatic representation of an electrical system particularly adapted for use in connection with the apparatus.

Referring to Figure 1, the numeral 10 designates the intake manifold of a motor vehicle engine to which is connected a carburetor 11, shown in the present instance as being of the down-draft type. The carburetor is provided with the usual throttle valve 12 mounted on a shaft 13, and an arm 14 is connected to this shaft to operate the throttle. The arm 14 is pivotally connected at its lower end as at 15 to an accelerator rod 16. This rod is operated conventionally, as will be apparent, and in Figure 5 of the drawings the rod 16 is illustrated as being provided at its rear end with a button 17 against which an accelerator pedal 18 operates. The rod 16 is shown as being provided with a return spring 18' tending to move the throttle toward closed position.

Referring to Figures 1 and 5, the numeral 19 designates a conventional clutch pedal freely mounted on the clutch shaft 20. An arm 21 is fixed in any suitable manner to the clutch shaft to operate the latter, and the pedal 19 is provided with a suitable lug 22 engageable against the upper end of the arm 21 in order to transmit movement from the pedal 19 to the arm 21 when the pedal is operated conventionally. A cable or similar element 23 is connected to the arm 21 as at 24 and the forward end of the cable is connected as at 25 to the rear end of a reciprocating rod 26 forming a part of a power device indicated as a whole by the numeral 27. The power device may be of any suitable type and is preferably of the type disclosed in the prior patent and co-pending application referred to. Such a power device includes casing sections 28 between which is clamped the peripheral portion of a diaphragm 29 operable by differential pressure and connected to the rod 26.

The principal elements of the valve mechanism are illustrated in Figures 2 and 4 of the drawings. Referring to Figure 2, the numeral 30 designates a valve cylinder in which is reciprocable a sleeve valve 31. A piston valve 32 is mounted to slide within the valve 31. The upper end of the valve cylinder 30 is closed by a head 33 and a bearing 34 is formed integral with the head 33 to slidably support a valve stem 35. A light spring 36 surrounds the stem 35. This spring has its lower end seating against the bearing 34 and its upper end engaging a washer 37 or similar device surrounding and fixed against upward movement with respect to the stem 35.

The stem 35 provides means for reciprocating the sleeve valve 31, and it will become apparent that any desired means associated with the throttle or accelerator may be employed for this purpose. The means illustrated, however, forms the most practicable operating means for the sleeve valve 31, and the stem 35 is preferably arranged vertically as shown in Figure 2 in order that it may be directly operated in conjunction with the accelerator and throttle. As shown, a cam 38 is preferably employed for operating the stem 35. This cam may be mounted on the throttle shaft 13 and has its edge in engagement with a head 39 secured to the upper end of the stem 35. The cam 38 is shown in Figure 2 in a position in which the throttle is in substantially open position, and accordingly the sleeve valve 31 is at its upper limit of movement. Under such conditions, the head 39 engages the low segment of the cam. The throttle is closed by rotating the shaft 13 in a counter-clockwise direction as viewed in Figures 1 and 2, and accordingly the height of the cam increases from the point 40 to the point 41. The point 41 contacts with the head 39 when the throttle is in idling position at which time the sleeve valve 31 will be moved downwardly to its lowermost position, for a purpose to be described. The throw of the cam decreases from the point 41 to the point 40, during which time the throttle is opened to a predetermined extent, for example, to a half open throttle position. Beyond the point 40, the edge of the cam is concentric with the axis of the shaft 13 throughout the remainder of the range of throttle movement. Accordingly, movement of the throttle does not affect the valve 31 while the head 39 contacts with the concentric portion of the cam, but movement of the throttle toward closed or idling position progressively moves the valve 31 downwardly, while the cam moves over the head 39 between the points 40 and 41. Conversely, opening movement of the throttle progressively releases the valve 31 for upward movement as the cam travels over the head 39 between the points 41 and 40.

The lower end of the valve cylinder 30 is enlarged to provide an annular flange 43 and a diaphragm 44 has the upper face of its peripheral portion engaging the outer portion of the flange 43. A cap 45, similar in diameter to the flange 43 and diaphragm 44, is seated against the latter, and screws 46 or other suitable fastening elements secure the cap 45 in position with respect to the flange 43. The diaphragm 44 and cap 45 form a vacuum chamber 47 for a purpose to be described. The lower end of the valve 32 is secured to the diaphragm 44 by a nut 48, and a spring 49 urges the diaphragm and valve 32 upwardly. The lower end of the spring 49 projects into an axial extension 50 carried by the cap 45 and engages against a spring seat 51. A screw 52 is provided for vertically adjusting the cap 51 to adjust the tension of the spring 49, and a lock nut 53 secures the screw 52 in adjusted positions.

The valve cylinder 30 is provided with a lateral extension 54 in which is formed a passage 55. This passage forms a port which communicates at its inner end with the interior of the valve cylinder 30 and a union 56 is tapped into the outer end of the passage 55. A conduit 57 is connected at one end to the union 56 and has its opposite end connected to the intake manifold 10 as at 58.

A vacuum chamber 59 extends along a portion of the valve cylinder 30 and is formed integral therewith. This chamber preferably is arranged diametrically opposite the port or passage 55 and has its upper extremity in transverse alinement therewith. The valve cylinder 30 is provided with an integral projecting portion 60 forming a vacuum passage 61 communicating at its inner end with the chamber 59. An integral passage 62 communicates at its upper end with the passage 61 and has its lower end extending through the flange 43. The lower end of the passage 62 communicates with an opening 63 formed in the adjacent peripheral portion of the diaphragm 44, and this opening, in turn, communicates with the vacuum chamber 47 through a port 64 formed in the cap 45. Accordingly it will be apparent that the communication of the chamber 47 with the passage 61 causes the diaphragm 44 to be influenced by differential pressure in the passage 61, and the flange 43 is provided with an atmospheric port 65 in order that the upper face of the diaphragm 44 may be always subject to atmospheric pressure. A union 66 is tapped into the outer end of the passage 61, and a conduit 67 is connected between the union 66 and the power device 27, as shown in Figure 1.

The sleeve valve 31 is provided with opposite circumferentially elongated ports 68 adapted for communication respectively with the port 55 and the upper end of the chamber 59. The sleeve valve 31 is further provided with a circumferentially elongated port 69 communicating with the chamber 59. The valve 32 is provided with circumferential grooves 70 and 71 forming ports adapted for communication respectively with the ports 68 and 69. When the valves are in the position shown with the engine throttle substantially open, the ports 69 and 71 afford communication between the chamber 59 and the atmosphere, in a manner to be described, while the ports 68 and 70 are substantially out of registration to disconnect the chamber 59 from the intake manifold. For the proper operation of the device, it will be noted that the remote extremites of the ports 70 and 71 are spaced apart a distance substantially equal to the inner or adjacent extremities of the ports 68 and 69.

An integral cylindrical extension 72 extends laterally from the valve cylinder 30, and a valve seat 73 divides the extension 72 into chambers 74 and 75. The chamber 75 is in constant communication with the atmosphere through a port 76 of substantial size. The chamber 74 is in restricted constant communication with the atmosphere through a port 77, and the effective area of this port is adapted to be adjusted by a screw 78 provided with a lock nut 79 for securing it in adjusted positions. A valve 80 normally engages the seat 73 to close communication between the chambers 74 and 75 and the interior of the extension 72 may be provided with a guide 81 in which the stem 82 of the valve 80 is reciprocable.

The extension 72 is provided with an enlarged annular flange 83 against which a diaphragm 84 is seated, and a cap 85 is arranged against the diaphragm 84 and secured to the flange 83 by suitable screws 86. The valve stem 82 has its end secured to the diaphragm 84 as at 87 and a spring 88 urges the diaphragm radially inwardly toward the axis of the valve cylinder 30, thus tending to move the valve 80 toward its seat. The cap 85 is provided with an axial extension 89 into which the spring 88 projects, and the spring engages a spring seat 90. The spring seat is adjustable by a screw 91 to vary the effective tension of the spring 88, and a lock nut 92 secures the screw 91 in adjusted positions. An integral passage 93 communicates at one end with the passage 61 and at its other end with an opening 94 formed in the peripheral portion of the diaphragm 84. The cap 89 is provided with a port 95 communicating between the opening 94 and the chamber 96 formed between the cap 85 and diaphragm 84. Thus it will be apparent that the chamber 96 is influenced by vacuum in the passage 61, and the cap 83 is provided with an atmospheric port 97 in order that the diaphragm 84 may have its adjacent face subject to atmospheric pressure at all times. In this connection, it will be noted that both of the diaphragm chambers 47 and 96 are influenced by vacuum in the passage 61, but the spring 88 is substantially lighter than the spring 49.

A cylindrical pocket 98 is formed integral with the valve cylinder 30 adjacent one end thereof and receives a solenoid 99. The solenoid is provided with an armature 100 forming a valve operative through an opening 101 formed in the extension 54, to form a closure for the port 55. A spring 102 normally urges the valve 100 toward closed position, and the upper end of the spring seats against a cap 103 arranged in the upper end of the solenoid 99.

In Figure 5 of the drawings an electrical system for use in connection with the apparatus is disclosed, and such system permits selective operation of the clutch control device as may be desired by the operator, and also permits the clutch to be operated conventionally. This system is similar to the system described and claimed in the copending application of Edward G. Hill and Henry W. Hey, Serial No. 678,078, filed June 28, 1933. The purpose of the electrical system is to permit the operator to operate the clutch in a conventional manner without automatic operation in any form, and it permits automatic free wheeling under all conditions when the accelerator pedal is released. The most practicable use of the system, however, lies in the provision of means for effecting automatic free wheeling whenever the accelerator pedal is released and the vehicle is in first, second or reverse gears, together with automatic free wheeling in high gear only when the accelerator is released with the vehicle speed below a predetermined point, for example, eight miles per hour. With such a system, the operator is permitted to shift gears whenever the accelerator is released with the gear set in first, second or third gears. However, de-clutching does not take place in high gear above the predetermined speed referred to, when the accelerator is released, and thus the vehicle engine is permitted to act as a brake under normal driving conditions. Such an advantageous electrical control system, in conjunction with the smoothness and accuracy of operation of the valve mechanism described, greatly facilitates the driving of a motor vehicle.

Referring to Figure 5, the numeral 104 designates the instrument panel of the vehicle and the ignition switch of the engine as indicated by the numeral 105 as being arranged on the panel 104 and movable into engagement with a stationary contact 106. The vehicle battery 107 has one side grounded as at 108 and the other side of the battery is connected to the ignition switch by a wire 109. A wire 110 connects the contact 106 to a main control switch 111 normally in engagement with a contact 112. This contact is connected by a wire 113 to one terminal of the solenoid 99. A wire 114 is connected to the other terminal of the solenoid and the two wires 113 and 114 may be arranged in a cable 115, as indicated in Figures 1 and 2. In this connection, it will be noted that the valve 100, operated by the solenoid 99, has been illustrated diagrammatically in Figure 5 as being associated with the conduit 57 in which case it functions in identically the same manner as the embodiment of the valve 100 in Figure 2. The latter structure is highly advantageous, however, inasmuch as it embodies all of the control means for the power device in a single apparatus.

A wire 119 leads from the wire 114 to a switch 120 supported with respect to the vehicle gear set 121 by suitable insulation 122. The switch 120 is normally biased into engagement with a stationary contact 123 and a wire 124 connects this contact to a ground 125. The switch 120 carries an insulating member 126 engageable by the second and high gear shift rod 127 of the gear set. It will be apparent that the shift rod 127 moves forwardly when the vehicle is in high gear to break the connection between the switch 120 and contact 123. These elements remain in contact with each other, however, when the gear set is in any position other than high gear.

The gear set 121 is provided with the usual gear shift lever 128 and a button switch 129 is arranged at the upper end of this lever. A wire 130 is connected between the button 129 and the wire 114. The gear shift lever is indicated as being grounded as at 131. It will become apparent that a circuit through the solenoid 99 may be completed independently of the switches 120 and 123, by depressing the button 129.

A wire 132 is connected at one end to the wire 130 and leads to a free wheeling switch 133. This switch is movable into engagement with a stationary contact 134 having a wire 135 leading to a ground 136. It will become apparent that when the switch 133 is closed, a circuit through the solenoid 99 will be maintained closed, regardless of the position of the gear set switch 120.

A speedometer indicated as a whole by the numeral 137 is mounted on the instrument panel. The indicating finger and dial of the speedometer are not shown and may be of any conventional type. A switch 138 is associated with the mechanism of the speedometer and moves with the indicating finger. A wire 139 grounds the switch 138 as at 140. An arcuate contact 141 is engageable by the switch 138 throughout a portion of the range of movement of the indicating finger of the speedometer. The switch 138 is in engagement with the contact 141 when the vehicle is at rest and leaves the contact 141 when the vehicle attains a predetermined speed, for example, a speed of approximately eight miles per hour. A wire 142 is connected between the wire 132 and the contact 141.

The operation of the apparatus is as follows:

It will be apparent that the connection of the power device 27 to the intake manifold is initially dependent upon the position of the solenoid valve 100. Regardless of the position of the valves 31 and 32, it will be obvious that the power device 27 cannot be operated if the valve 100 is closed. Obviously the solenoid 99 is deenergized whenever the ignition switch 105 is open and accordingly there is no constant drain on the battery. It will later become apparent that the solenoid 99 is likewise deenergized when the vehicle is in high gear and traveling at a speed above the predetermined speed referred to, namely, approximately eight miles per hour. Accordingly the solenoid is energized under ordinary conditions only a small percentage of the time and accordingly does not constitute a serious drain on the vehicle battery.

As previously stated, the initial low point 40 of the cam 38 comes into engagement with the head 39 when the throttle reaches approximately a half open position, and the cam beyond such point is concentric with the axis of the shaft 13. Between the half open and fully open throttle positions, therefore, there will be no movement of the valve stem 35 and its associated valve 31. Between the cam points 40 and 41 however the valve 31 is actuated to accomplish several results with the present apparatus, depending upon the direction of movement of the throttle.

Assuming that the vehicle is being driven in high gear under normal conditions with the throttle between the half open and fully open positions, the concentric portion of the cam will be in engagement with the head 39, as previously stated, and except under exceptional torque conditions, the brush or switch finger 138 will be arranged beyond and out of engagement with the contact 141, and the solenoid 99 will be deenergized. The valve 100 is biased toward closed position, as previously stated, and will occupy such position when the solenoid 99 is deenergized, as shown in Figure 2. Under such conditions there obviously can be no connection between the power device 27 and the intake manifold. Assuming that the vehicle is traveling under exceptionally heavy torque conditions with the cam engaging the head 39 in the manner stated, the brush 138 may be in engagement with the contact 141, under which conditions the solenoid 99 will be energized to open the valve 100 in a manner to be described. Under such conditions however the power device will not be affected since the ports 68 and 70 will be out of registration with each other, thus disconnecting the power device from the intake manifold. The clutch will thus remain in normal engagement, and any creeping of the clutch due to leakage between the ports 68 and 70 will be prevented through the fact that the ports 70 and 71 are in communication and thus open the chamber 61 to the atmosphere through the bleed port 77.

As previously stated, the solenoid 99 is deenergized when the throttle is open to a substantial extent under ordinary conditions, and assuming that the vehicle is being driven under normal conditions, for example when driving on a level road, the valve 100 will be closed and the ports 68 and 70 will be disconnected. If the driver then desires to stop the vehicle, he releases his foot from the accelerator, thus causing the throttle to return to the idling position shown in Figure 1, and the cam will be rotated until the high point 41 engages the head 39. This movement of the cam transmits downward movement to the valve stem 35, and thus the ports 69 and 71 will be moved out of registration with each other while the ports 68 and 70 will be moved into registration, whereupon the power device will be disconnected from the atmosphere while the passage 61 will be connected to the inner end of the passage 55.

Under such conditions the clutch will not be disengaged since the valve 100 will be in its normally closed position, thus preventing the inner end of the passage 55 from being connected to the intake manifold. The releasing of the accelerator, however, causes the vehicle to decelerate, and since the clutch is not disengaged, the vehicle motor acts as a brake in accordance with conventional practice. More rapid deceleration, of course, will be caused by the operation of the vehicle brake, but the clutch will remain in engagement in the manner stated until the vehicle speed has dropped below a predetermined point, for example, eight miles per hour. When such predetermined point is reached, the brush 138 will engage the contact 141 and will remain in engagement therewith throughout the complete deceleration of the vehicle. Under such conditions, a circuit will be established from the battery 107 through switches 105 and 111 and the wires associated therewith, through solenoid 99 and wire 114, through wires 130, 132 and 142, through the speedometer switch elements 138 and 141, and back to the source through wire 139 and grounds 140 and 108. The solenoid 99 thus will be energized to open the valve 100, and since the valves 31 and 32 will have been previously placed in operative condition, as described, the power device will be connected to the intake manifold and will be operated by differential pressure to disengage the clutch.

As long as the vehicle remains at rest, it will be apparent that the circuit to the solenoid will be completed in the manner described, and with the throttle in idling position, to maintain the valves 31 and 32 in operative relationship, the clutch will remain disengaged. Of course, the operator after stopping the vehicle in the manner described will move the gear shift lever 128 to neutral position, and with the clutch disengaged, the operator may start the vehicle at any time by placing the gear shift lever in low gear position without the necessity of having to operate the clutch.

The reduction in the pressure in the conduit 61 disengages the clutch, as previously stated, and the reduction in pressure is transmitted to the diaphragm chambers 47 and 96 through their respective passages 62 and 93. Accordingly the differential pressure acting on the opposite sides of the diaphragm 44 will maintain the valve 32 in its lowermost position with the ports 69 and 71 disconnected from each other and with the ports 68 and 70 in registration. With the valves in such relative positions, the lower extremities of the ports 68 will coincide with the lower extremity of the port 70. It will be apparent that the movement of the cam 38 is not required to move the valve 32 to its lowermost position, since the establishment of a pressure differential on opposite sides of the diaphragm 44 effects movement of the valve 31. The ports 68 may be vertically elongated as shown in Figure 2 in order to prevent the sudden releasing of the accelerator from causing the ports 68 to over-run the port 70 and close such port before the differential pressure affecting the diaphragm 44 has had an opportunity to move the valve 32 to operative position.

When the operator desires to start the vehicle in motion, he merely places the gear shift lever in low gear position and this movement is permitted without operation of the clutch pedal since the clutch will have been previously disengaged in the manner stated. The accelerator then may be operated to progressively open the throttle 12. It should be remembered that this movement is started with the cam 38 in the position shown in Figure 1, that is, with the high point 41 of the cam holding the valve 31 in its lowermost position. As the throttle progressively opens, the cam portion between the points 40 and 41 will progressively move across the head 39, and thus the head 39, stem 35 and valve 31 will be permitted to move upwardly. As soon as the throttle has been slightly opened, the ports 68 will be carried out of registration with the port 70 to disconnect the power device from the intake manifold, while the ports 69 and 71 will be initially brought into communication at the same time that the ports 68 and 70 move out of registration. It should be recalled that when a partial vacuum exists in the power device to retain the clutch in disengaged position, such partial vacuum is communicated to the diaphragm chambers 47 and 96 whereby differential pressure is caused to actuate the two diaphragms. Under such conditions, the initial operation of the accelerator pedal takes place with the valve 32 in its lowermost position and with the valve 80 in open position to afford unrestricted communication between the port 76 and chamber 74. The registration of the ports 69 and 71 thus permits air to rush into the power device tending to establish pressure equalization therein.

The action referred to causes an immediate increase in pressure in the vacuum side of the power device to the point where the differential pressure acting on opposite sides of the diaphragm 29 becomes insufficient for holding the clutch in fully disengaged position against the tension of the clutch springs. Thus the clutch plates will promptly move rapidly toward engaged position, and this movement is transmitted to the diaphragm 29 causing this element to act as a suction pump whereby it tends to prevent the establishment of atmospheric pressure in the power device and its associated vacuum connections. Thus it will be apparent that an increase in pressure occurs in the power device, and in the conduit 67, chamber 61 and diaphragm chambers 47 and 96, although the relatively slow operation of the accelerator pedal does not permit the pressure to approach that of the atmosphere.

It will be apparent that the pressure increase will be dependent upon three elements, namely, the area of the diaphragm 29 of the power device, the rate of movement of such diaphragm, and the effective area of the opening provided through the ports 69 and 71. The effective area of the opening through ports 69 and 71 acts to restrict the passage of air into the power device to maintain the pressure below the point at which the spring 49 will transmit movement to the diaphragm 44 and valve 32. The spring 88 associated with the diaphragm 84 is much weaker than the spring 49 and accordingly is permitted to act only at substantially higher pressures than the spring 49. It will be apparent therefore that air continues to flow into the power device around the valve 80.

Assuming that the accelerator is actuated relatively slowly with the vehicle in low gear, the initial contact of the clutch plates disturbs the relationship between the three elements referred to, namely, the area of the diaphragm 29, the rate of movement of such diaphragm, and the effective opening through ports 69 and 71, by retarding the movement of the clutch plates and hence the movement of the diaphragm 29. Under such conditions there will be an immediate rise in pressure in the power device and its associated vacuum connections. This rise in pressure reduces the differential pressure on opposite sides of the diaphragm 44, whereupon the spring 49 moves the diaphragm 48 upwardly until the spring pressure balances the differential pressure affecting the diaphragm 44. This balancing action takes place under the conditions being considered, that is, with the throttle being slowly opened, after the valve port 71 has been moved upwardly out of registration with the port 69. It will be apparent therefore that the further admission of air into the power device will be cut off and the movement of the clutch elements will be checked at the point of initial engagement.

Assuming that the throttle partakes of no further movement after the movement of the clutch elements has been arrested in the manner stated, the clutch elements will remain indefinitely at the point of initial engagement. Any tendency toward further engagement of the clutch elements must result from a leakage of air into the power device, and such leakage will increase the pressure in the diaphragm chamber 47 to permit further upward movement of the valve 32. Such upward movement of this valve will then "crack" the ports 68 and 70 to afford a leakage between the intake manifold and the power device to balance the leakage which has taken place through the atmospheric ports. In this connection, it is again noted that the distance between the remote extremities of the ports 70 and 71 is substantially equal to the distance between the adjacent extremities of the ports 68 and 69. Accordingly any slight movement of the valve 32 beyond the point where the lower extremity of the port 71 coincides with the upper extremity of the port 69 will carry the upper extremity of the port 70 slightly past the lower extremity of the port 68 to afford the vacuum leakage referred to, whereby the clutch elements will be retracted to the point of initial engagement in the manner previously described. Any tendency of the clutch plates to be retracted with respect to each other through vacuum leakage will increase the differential pressure affecting the diaphragm 44 to move the valve 32 slightly downwardly to "crack" the ports 69 and 71 to provide an air leakage into the power device to counteract the retraction of the clutch elements. Thus, with the throttle in the proper position, the clutch elements will remain indefinitely at the point of initial engagement.

Ordinarily of course the operator does not hold the throttle indefinitely in the position referred to but proceeds with the depression of the accelerator pedal to start the vehicle. With the vehicle in low gear, as previously stated, the operator presumably will depress the accelerator pedal rather slowly, in which case the portion of the cam between the points 40 and 41 will continue to move slowly over the head 39, thus permitting continued slow upward movement of the valve 31. The clutch elements will then move into operative engagement at a rate substantially proportionate to the rate of upward movement of the valve 31. As this valve moves upwardly, the ports 68 tend to remain beyond the port 70, while the port 69 tends to move into registration with the ports 71. With the throttle moving slowly, the port 69 will remain in slight registration with the port 71 adjacent the bottom thereof, since the continued admission of air into the power device through ports 69 and 71 continues to reduce the pressure differential affecting the diaphragm 44 whereby the valve 31 continues to move upwardly, and tends to move out of registration with the port 69. Accordingly it will be apparent that the ports 69 and 71 act both as check means for checking the movement of the clutch elements at the point of initial engagement under the conditions being considered, and as bleed means for permitting the clutch elements to move into operative engagement after their movement has been checked.

The opening movement of the throttle in the manner referred to accordingly permits rapid movement of the clutch elements approximately to the point of initial engagement, checks their movement at such point, and then permits relatively slow movement of the clutch elements into operative engagement substantially in proportion to the rate of acceleration of the vehicle engine incident to the opening of the throttle. After complete clutch engagement has taken place and the vehicle has attained the desired headway, the operator is ready to shift into intermediate gear, whereupon he fully releases the accelerator pedal. This action repeats the operation of effecting clutch disengagement since the downward movement of the valve 31 will be effected by the cam, and the ports 68 and 70 will be brought into registration while the port 69 moves downwardly beneath the port 71. The operator then may place the gear shift lever in intermediate position, whereupon the automatic operation of bringing the clutch elements into operative engagement again takes place, but under slightly different conditions to be described.

In connection with the operation of the device when the gear shift lever is in first, second or reverse gears, attention is invited to the fact that the solenoid 99 will be always energized to maintain the valve 100 in open position since the switch member 120 is in engagement with the contact 123 at all times except when the vehicle is in high gear. Under the latter condition, the high gear shift rod 127 moves the switch 120 out of engagement with the contact 123 when the vehicle is in high gear, and under such conditions the energizing of the solenoid is dependent upon engagement of the switch arm 138 with the contact 141. The foregoing description of the starting of the vehicle in low gear accordingly takes into account the fact that the valve 100 is open under the conditions described.

As previously stated, the accelerator is released when the vehicle attains sufficient momentum in low gear, whereupon the valve 31 is forced downwardly to connect the power device to the intake manifold and disconnect it from the atmosphere whereupon automatic declutching takes place. The gear shift lever is then moved into second gear position, whereupon the accelerator is again depressed to accelerate the motor and release the clutch elements for proper movement into engagement with each other.

Prior types of automatic clutch control devices have operated on the theory that the clutch elements should be released for rapid movement and then checked at the point of initial engagement under all conditions, that is regardless of whether the gear set is in high gear and regardless of the rate of operation of the accelerator. It was found that with such prior devices substantially smooth clutch engagement could be obtained, but that there was some spinning of the motor prior to operative clutch engagement under the usual practice of accelerating the motor in second and high gears more rapidly than in low gear. I have discovered that this was due to the practice of checking the clutch elements under all conditions at the point of initial engagement and that the more rapid acceleration of the vehicle engine as is desired in second and high gears caused the motor speed to increase too greatly in proportion to the rate of movement of the clutch elements into operative engagement, except when the throttle was opened very suddenly. The present apparatus overcomes the difficulty referred to by shifting the point of checking of the clutch elements in accordance with operating conditions.

In this connection, attention is invited, for example, to the copending application of Edward G. Hill and Henry W. Hey, Serial No. 587,578, filed January 19, 1932, which discloses the idea of utilizing the increase in pressure in the power device incident to initial contact of the clutch elements for checking the movement of such elements. The check valve disclosed in such copending application moves across and closes a fixed port when the point of initial engagement of the clutch elements is reached, whereby checking of the clutch elements takes place at a fixed point under all conditions. In the present apparatus, it will become apparent that a movable check port is provided in place of the fixed port disclosed in the copending application referred to, and accordingly the checking of the clutch elements takes place progressively later in accordance with the progressively more rapid opening movement of the engine throttle up to a certain point.

Assuming that the gear shift lever is now in intermediate position with the throttle in idling position, the operator depresses the accelerator pedal and performs this movement somewhat more rapidly than when the vehicle was in low gear, this being the conventional practice as is well known. The operation of the throttle obviously rotates the cam 38 in a clockwise direction from the position shown in Figure 1 whereupon the vehicle engine will be accelerated and the valve 31 will be moved upwardly. It will be noted that the operation which now takes place in connection with the clutch control mechanism is substantially identical with the operation previously described except that the more rapid operation of the throttle results in the valve 31 moving upwardly more rapidly than is true in the previously described operation. It will be apparent from the foregoing description that the checking of the clutch elements occurs when the increase in pressure in the power device and in the chamber 47 reaches the point where the spring 49 is able to move the valve 32 upwardly to the point where the port 71 moves past the port 69 to disconnect the power device from the atmosphere. Due to the more rapid operation of the accelerator under the conditions now being considered, the port 69 moves upwardly more rapidly than under the slower throttle operation in low gear, and consequently the valve 32 moves vertically to a slightly greater extent before the port 71 becomes disconnected from the port 69.

In other words, the more rapid operation of the accelerator in accordance with conventional practice when the gear shift lever is in intermediate position results in the somewhat later checking of the clutch elements, the check point under such conditions being slightly later than the point of initial engagement of the clutch elements but obviously substantially ahead of the point of positive clutch engagement. At the same time, the more rapid acceleration of the vehicle engine and the fact that the vehicle has attained substantial momentum makes it desirable that the check point occur later than when the vehicle is started more slowly in low gear, and accordingly the present apparatus automatically takes care of the condition referred to. As previously stated the prior forms of clutch control apparatus provide a check valve movable toward checking position as the clutch elements move toward the point of initial engagement, and the check valve operates in conjunction with a fixed check port. In the present apparatus, the port 69 acts as the check port and its position shifts in accordance with the conditions of throttle operation as is desirable. Accordingly the too rapid acceleration of the engine in proportion to the degree of clutch engagement is eliminated and the spinning of the motor as in prior constructions is eliminated. This automatic operation accordingly more closely simulates skillful conventional operation and at the same time eliminates the excessive wearing of the clutch plates which occurs through the spinning of the motor with respect to the clutch elements with prior automatic clutch control apparatus.

After the vehicle has attained proper momentum in intermediate gear, the foregoing operations are repeated, the accelerator being fully released to idling position and the clutch being automatically disengaged, whereupon the operator moves the gear shift lever into high gear position. The accelerator is then depressed again to bring the clutch elements into engagement, and substantially the same operation takes place in high gear as in second gear except that the checking point of the clutch elements takes place slightly later. As previously stated it is the conventional practice to accelerate the vehicle motor more rapidly in second gear than in low gear, and similarly, it is the conventional practice to accelerate the motor more rapidly in high gear than in second gear. With the present apparatus the result of such motor acceleration is that the checking point will occur slightly later due to the fact that a slightly greater increase in the pressure in the diaphragm chamber 47 must occur in order to check the clutch elements since the port 71 must move upwardly to a slightly greater extent than in the preceding case before the checking occurs. This obviously is due to the more rapid operation of the accelerator whereby the port 69 is carried upwardly to a slightly greater extent than in the preceding case. Accordingly clutch engagement in second and high gears can be accomplished more smoothly and accurately than in prior constructions without the spinning of the motor with respect to the clutch elements. The complete operation also is carried out in less time than is required by prior constructions. While the foregoing description covers the operation of the device when the vehicle is in low, intermediate and high gears, it will be apparent that the vehicle can be just as well started in intermediate gear as is the practice of a large proportion of motor vehicle drivers. Under such conditions, it merely is necessary to operate the accelerator more slowly to secure relatively slow clutch engagement until the vehicle has attained substantial headway.

The foregoing description, in the interest of clarity, has assumed that the accelerator is first moved and then stopped until checking of the clutch elements takes place, but in actual practice, there ordinarily is no actual stopping of the movement of the valve 31. The operator progressively depresses the accelerator pedal under ordinary conditions, and checking of the clutch elements takes place substantially at the point of initial engagement or progressively later than such point upon the progressively greater speed of operation of the accelerator. The ports 69 and 71 cooperate with each other to accomplish the checking of the clutch elements, and they further operate to provide the means for bleeding the power device to the atmosphere to permit final engagement of the clutch elements after their movement has been checked. Accordingly it will be apparent that the present apparatus wholly eliminates the use of a separate bleed means for the power device as shown, for example, in the prior patent of Edward G. Hill and Harry W. Hey, No. 1,881,188, granted October 4, 1932. Thus it will be apparent that the present device constitutes a substantial improvement over prior constructions and at the same time greatly simplifies the means required for the automatic operation of the clutch.

The checking of the clutch elements takes place in the manner previously described by the upward movement of the valve 32 to carry the port 71 vertically upwardly past the port 69. The further movement of the accelerator beyond the checking point progressively releases the valve stem 31 for upward movement until the cam point 40 is reached, and during such movement, the port 69 will progressively move upwardly at a rate depending upon the rate of operation of the throttle. If the throttle is moved slowly after the checking point is reached, the port 69 will continue a slight communication with the port 71 to admit air relatively slowly into the power device until the cam point 40 contacts with the head 39. More rapid operation of the accelerator moves the port 69 upwardly more rapidly thus tending to maintain a greater degree of communication between the ports 69 and 71, and thus final engagement of the clutch elements will take place to a correspondingly rapid degree. Thus it will be apparent that the ports 69 and 71 provide bleed means for the power device after the clutch elements have been checked, as well as to provide the means through which the checking of the clutch elements is effected.

Beyond the point 40, the cam is concentric with the axis of the throttle shaft 13, and during the range of movement of the accelerator while the concentric portion of the cam engages the head 39, it will be apparent that no movement of the valve 31 takes place. During such range of operation of the throttle, the ports 69 and 71 are in full communication, and the power device is maintained in fixed communication with the atmosphere through the restricted port 77 (see Figure 4). During normal engagement of the clutch elements therefor, the function of the port 77 is to positively connect the power device to the atmosphere to prevent the creeping of the clutch elements.

The theory of operation of the present apparatus wherein a variable checking of the clutch elements occurs depending upon the rate of operation of the throttle has been found highly satisfactory in practice, particularly when the operator depresses the accelerator as is done under normal conventional driving conditions. In other words, the accelerator may be operated more rapidly in second gear than in low gear, and still more rapidly in high gear than in intermediate gear. At times, however, an operator may depress the accelerator with extreme rapidity, thus tending to maintain the port 69 in full communication with the port 71. In other words, the reasonably rapid operation of the accelerator causes the port 69 to lag with respect to the port 71 thus limiting communication between these ports, and under such conditions, the previously described operation takes place. The unreasonably rapid operation of the accelerator, however, prevents the port 71 from leading with respect to the port 69 and the full communication between these ports, without any control means for the air passing therethrough, would result in the rapid movement of the clutch elements from the point of complete disengagement substantially to the point of complete engagement. Under such unreasonable conditions of operation a jerking of the vehicle would occur in exactly the same manner as if the operator should depress the accelerator rapidly and suddenly release the clutch pedal substantially completely. This jerking of the vehicle is automatically eliminated with the present apparatus, thus providing a substantial advantage over conventional operation. The sudden engagement of the clutch elements cannot take place with the present apparatus as is true under conditions of conventional operation.

Referring to Figure 4, it will be recalled that the diaphragm port 93 communicates with the chamber 61 to be influenced by the same pressure as the power device and whenever a partial vacuum is present in the power device, the same partial vacuum affects the diaphragm 84. The spring 88 is of relatively slight tension and accordingly a relatively slight pressure differential on opposite sides of the diaphragm 84 is sufficient to maintain the valve 80 in open position. The reasonably rapid operation of the accelerator under the various conditions previously described does not reduce the pressure differential on opposite sides of the diaphragm 84 sufficiently to permit the valve 80 to close, and the entire operation of the present apparatus under such conditions is wholly dependent upon the ports of the valves 31 and 32. When complete clutch engagement takes place, atmospheric pressure will be established in the chamber 61 and consequently in the chamber 96, whereupon the valve 80 will move to closed position. Under normal operating conditions, the valve 80 will obviously not close until after complete clutch engagement has taken place, and will open immediately upon the reduction of the pressure in the chamber 61.

The function of the valve 80 and the control means therefor is highly important in that they prevent the sudden operative engagement of the clutch elements if the accelerator is unreasonably suddenly operated. As previously stated, such an operation of the accelerator pedal causes substantially complete registration of the ports 69 and 71, thus causing a rapid increase in pressure in the port 61. Under such conditions the diaphragm 29 of the power device will move with extreme rapidity toward the point of initial engagement of the clutch elements, but the sudden increase in pressure in the chamber 61 is immediately communicated to the chamber 96, whereupon the spring 88 moves the valve 80 to closed position. Regardless of the position of the ports 69 and 71, therefore, communication between the power device and the atmosphere will be restricted by the port 77, and the effective area of this port is subject to adjustment by the screw 78. The unreasonably rapid operation of the accelerator thus brings the valve 80 into operation to close the power device to substantial communication with the atmosphere, and thus the rapid movement of the clutch elements into operative engagement is prevented.

From the foregoing description it will be apparent that the valve 100, associated with the solenoid 99, is maintained in open position at all times while the vehicle is in first, second or low gears, and this is true regardless of the position of the accelerator. The circuit is completed from the battery 107 through switches 105 and 111 and their associated wires, through the solenoid and wires 114 and 119, and thence back to the battery through switch 120, contact 123 and ground 125. When the gear shift lever is in high gear position, the shift rod 127 is extended forwardly into engagement with the insulating member 126, and thus the circuit between the switch 120 and contact 123 is broken as long as the gear shift lever is in high gear position. This is desirable in order to prevent any substantial drain on the battery by the energization of the solenoid 99 when the vehicle is in high gear, and it will be apparent that the vehicle is in high gear during the majority of the time during which the vehicle is in operation.

The majority of motor vehicle drivers prefer to utilize the vehicle engine as a brake to decelerate vehicle speed when the accelerator is released instead of having to depend wholly upon the vehicle brakes as is true with the systems of so-called "free wheeling". The present apparatus provides means for accomplishing the desired result and at the same time provides for automatic declutching when the vehicle speed is decelerated to a predetermined extent. Referring to Figure 5 it will be noted that the speedometer switch 138 and contact 141 are connected in series with the solenoid 99. When in high gear above the predetermined speed previously referred to, for example, eight miles per hour, the engagement between the switch 138 and contact 141 will be broken, and the valve 100 will remain closed. Regardless of the relative positions of the valves 31 and 32, therefore, there can be no automatic releasing of the clutch, and accordingly the vehicle engine may be utilized as a brake.

When the vehicle speed drops below approximately eight miles per hour, the switch 138 will move into engagement with the contact 141 and will maintain its engagement therewith throughout the remaining deceleration of the vehicle. Accordingly a circuit will be established through the solenoid over wires 110, 113, 114, 132 and through the contact 141 and switch 138. The valve 100 accordingly will be opened, and the accelerator having been released, the valves 31 and 32 will be in the proper relative positions to effect automatic de-clutching. Accordingly the vehicle engine may be used as a brake, and the clutch will be automatically released when the vehicle speed drops to approximately eight miles per hour. This predetermined speed is not critical and may be readily determined by the length of the contact 141 as will be apparent.

For drivers who prefer the operation of "free wheeling" the switch 133 is provided. This switch is in parallel with the circuit through the speedometer switch, and when the switch 133 is closed, the circuit through the solenoid 99 will be completed independently of the speedometer switch. Accordingly it will be apparent that automatic free wheeling may be accomplished automatically in high gear whenever the accelerator is released, by merely closing the switch 133. When the vehicle is in high gear with the switch 133 open and the vehicle is traveling relatively rapidly it may be desirable to disengage the clutch. For example, if it is desired to shift from high to intermediate gear on a steep incline, it is not desirable to permit vehicle deceleration to eight miles an hour to close the solenoid circuit through the speedometer switch, and for this reason, the gear shift lever button 129 is provided. Gear shifting may be accomplished under any conditions by releasing the accelerator pedal and pressing the button 129 to complete the solenoid circuit from the wire 114, through wires 130 and 132, button 129 and ground 131.

As previously indicated, it is the common practice in automatic clutch control apparatus to effect automatic de-clutching upon the releasing of the accelerator pedal to permit gear shifting without operating the clutch pedal by foot. With such prior constructions, however, the action of de-clutching does not start until the accelerator pedal has been completely released, and this operation is highly disadvantageous. Assuming that a vehicle is in low gear and the accelerator is gradually depressed to a nearly open position, the accelerator pedal is then released preparatory to shifting into intermediate gear. During the releasing of the accelerator pedal, the vehicle engine will be rapidly decelerated prior to the disengagement of the clutch, which action cannot take place until the accelerator is completely released. Such operation results in a jerking of the vehicle at each releasing of the accelerator pedal. The present apparatus automatically operates to prepare the clutch for complete disengagement prior to the complete releasing of the accelerator pedal, and the releasing of the clutch accordingly is greatly facilitated and takes place without causing any jerking or lunging of the vehicle.

Assuming that the solenoid valve 100 is open, for example when the vehicle is in low gear, the controlling of the power device will be dependent entirely on the valves 31 and 32. When the accelerator pedal under such conditions has been depressed to accelerate the motor and initiate the movement of the vehicle it is subsequently released preparatory to shifting the gears. During the releasing movement of the accelerator, the cam 38 rotates in a counterclockwise direction, and during the movement of the portion of the cam between the points 40 and 41 over the head 39 progressive downward movement of the valve 31 will take place. After a short portion of this movement has taken place, the ports 68 will start to communicate with the port 70 while the port 69 will be carried downwardly out of communication with the port 71. Thus communication will be established between the power device and the intake manifold, depending upon the degree to which the ports 68 and 70 communicate with each other. If these ports are brought into partial communication and the accelerator is not further released, a reduction in pressure in the power device and in the chamber 61 will occur, and this reduction in pressure will be communicated to the chamber 47 until sufficient pressure differential is built up on opposite sides of the diaphragm 44 to move the valve 32 downwardly to the point where the ports 68 and 70 are disconnected. There will be no further reduction in the pressure in the power device, but the diaphragm 29 of the power device will have been moved to partly release the clutch plate pressure.

Assuming that the releasing of the accelerator progressively continues to fully idle position, it will be apparent that the reduction in the pressure in the power device continues from the point at which the ports 68 and 70 are first brought into communication, and by the time the valve 31 reaches its lowermost position, the reduction in the pressure in the power device will be sufficient to substantially completely disengage the clutch elements. The progressive reduction in pressure in the power device, starting at a point prior to the complete releasing of the accelerator, results in the more rapid complete disengagement of the clutch elements when the accelerator reaches idling position, the clutch elements being substantially completely released before the accelerator reaches such position. The jerking of the vehicle incident to the operation of prior clutch control devices of the character discussed above, accordingly is completely eliminated in the present apparatus, and declutching takes place very smoothly when it is desired to shift the gears. Moreover, many vehicle operators object to the use of prior clutch control devices for free wheeling because of the jerking of the vehicle in the manner referred to, and the present device removes this objection and permits smooth clutch disengagement under all conditions.

As previously stated, the reduction in the pressure in the power device starts to take place as soon as the valve 31 has moved downwardly to the point where initial communication takes place between the ports 68 and 70. Very frequently the vehicle is normally operated with the portion of the cam between the points 40 and 41 in engagement with the head 39, when there is no desire or intention to shift the gears, and the reduction of the pressure in the power device resulting during such range of movement of the accelerator would appear to be disadvantageous because of the releasing of the clutch plate pressure. This is not true however and there is no slipping of the clutch under normal operating conditions as will become apparent.

Assuming that a vehicle is being driven in relatively heavy city traffic in high gear, the releasing of the accelerator to the point where communication will be established between ports 68 and 70, the reduction in pressure in the power device resulting from such action will be communicated to the chamber 47, thus moving the diaphragm 44 and valve 32 downwardly until the port 70 has been moved out of communication with the ports 68. If no further releasing of the accelerator takes place, the vehicle will then proceed with the clutch plate pressure partially reduced. This is a matter of no serious consideration, however, since the throwout bearings of present day clutches are designed to withstand "riding" of the clutch and no damage will result to the clutch unless slippage occurs between the plates. While the plate pressure will be reduced under the conditions referred to, it will be apparent that the partial releasing of the accelerator will likewise reduce the engine torque, and in practice it has been found that there is not the slightest tendency of the clutch plates to slip. A further slight releasing of the accelerator will result in a further slight reduction in the clutch plate pressure, and such reduction is proportionate to the reduction in engine torque.

Assuming that the vehicle is traveling in high gear at a speed of ten miles per hour, for example, there will be a reduction in the pressure of the clutch plates corresponding to the reduction in the engine torque, as previously stated. Under such conditions of operation the ports 70 and 71 will lie in a position with their remote edges coinciding with the adjacent edges of the ports 68 and 69. Any movement of the valve 31 will then afford communication between either the ports 68 and 70 or the ports 69 and 71. If, under the conditions referred to, the driver then depresses the accelerator pedal, the valve stem 35 will immediately start to move upwardly and there will be a prompt positive disconnection of the ports 68 and 70 and a similarly prompt connection of the ports 69 and 71, whereupon air will flow into the power device to reduce the pressure differential therein and the pressure of the clutch plates will be immediately increased, depending upon the extent to which the accelerator has been depressed. If the accelerator is depressed slightly to increase the vehicle speed only to a slight extent, the upward movement of the valve 31 will be correspondingly slight, and when a corresponding increase in pressure occurs in the diaphragm chamber 47, the port 71 will move upwardly sufficiently to disconnect it from the port 69.

Thus it will be apparent that the valve mechanism of the present device functions during a portion of the operation of the accelerator to provide a clutch plate pressure which is proportionate to the engine torque whereby normal vehicle operation may take place under all conditions without any slippage of the clutch plates. This theory of operation is highly advantageous in that it permits the initial operation of the power device as the accelerator is released so that complete releasing of the clutch elements is effected immediately upon the complete releasing of the accelerator pedal. This releasing of the clutch plates accordingly does not lag behind the releasing of the accelerator pedal as in prior constructions, and the jerking of the vehicle upon the releasing of the accelerator is wholly eliminated. In actual practice it has been found that the present device simulates expert conventional operation, and no skill whatever is required for its operation. The jerking of the vehicle does not occur either upon the releasing of the clutch elements or upon the engagement thereof, and the latter is true even if the accelerator is depressed unreasonably rapidly.

All conditions of operation which are taken care of conventionally may be accomplished with great facility with the present apparatus. For example, assuming that the vehicle is in low gear and the operator desires to pull out into a line of highway traffic, he may depress the accelerator slowly to accomplish relatively slow clutch engagement until the vehicle has moved slightly away from the curb or similar place with the clutch possibly slipping in accordance with conventional practice. It is frequently necessary under such conditions for the operator to discontinue further movement of the vehicle because of the approach of traffic from the rear, and this is accomplished conventionally by the slight releasing of the clutch elements and the corresponding releasing of the accelerator pedal. This operation is accomplished automatically with the present apparatus, since any slight releasing of the accelerator pedal after partial clutch engagement has taken place moves the valve 31 slightly downwardly to fully disconnect the ports 69 and 71 and "crack" the ports 68 and 70. Thus a reduction in pressure in the power device will occur to retract the clutch elements to a slight extent from the point at which they have been previously engaged, and thus the vehicle will be wholly or substantially wholly stopped until it is desired that its movement be resumed. The subsequent depression of the accelerator pedal then moves the valve 31 upwardly to disconnect the ports 68 and 70 and establish communication between the ports 69 and 71 to admit air into the power device to permit clutch engagement in accordance with the previously described operation of the device.

The proper checking point may be secured by adjustment of the tension of the spring 49. This adjustment is readily accomplished by loosening the lock nut 53 and turning the screw 52 until the proper adjustment is obtained, after which the lock nut 53 is again tightened. Checking will then take place at the proper point depending upon the operating conditions previously described, and no further adjustment of the spring 49 is necessary. The tension of the spring 88 is adjusted in a similar manner to determine the pressure in the chamber 96 at which the valve 80 will close. The valve 80 may be termed a "governor valve" inasmuch as it governs the proper operation of the valves 31 and 32 and prevents the latter from functioning to permit the clutch elements to move too rapidly into engagement with each other.

From the foregoing it will be apparent that the present apparatus provides smooth and efficient operation of the clutch under all conditions, all jerking of the vehicle being eliminated. It will be further noted that the valves 31 and 32 function to provide a variable clutch plate checking point in accordance with varying operating conditions, and that they function to reduce the clutch plate pressure in proportion to the reduction of the engine torque so as to act as means for preparing the clutch elements for disengagement as well as means for effecting the complete disengagement of the clutch elements. The electrical system illustrated in Figure 5 permits the selection of the operating conditions in accordance with the desires of the operator. The switch 105 is the vehicle ignition switch, and none of the selective circuits can be closed so long as this switch is opened. The switch 111 is provided for the purpose of permitting the operator to employ conventional operation if he desires, since the switch 111 is in series with all of the selective parallel circuits, and the opening of the switch 111 prevents energization of the solenoid 99 to permit the valve 100 to remain in closed position. The switch 133 may be closed to permit free wheeling whenever the accelerator is released regardless of any other conditions. The transmission switch 120 permits free wheeling automatically upon the releasing of the accelerator when the gear shift is in first, second or low gears, but prevents such operation when the vehicle is in high gear. The speedometer switch 138 provides automatic free wheeling when the vehicle is in high gear and below a predetermined vehicle speed in order that the vehicle engine may be employed for braking purposes.

It will be apparent that the valve mechanism is operative for either retarding or arresting the movement of the clutch elements, depending upon the mode of operation of the throttle. For example, if the accelerator is operated through an initial portion of its range of movement and is then stopped to hold the throttle in a partially open position, the movement of the clutch elements will be arrested. On the other hand, if the accelerator is progressively depressed a substantial distance to progressively open the throttle to a substantial extent, movement of the clutch elements will be merely retarded since the valve 32 will initially move rapidly with respect to the valve 31 and then will continue to move more slowly to tend to assume a neutral position with respect to the valve 31 in which the power device will be cut off from the atmosphere. Such neutral position, however, cannot be reached so long as the valve 31 continues to move, and thus air will be continuously admitted into the power device and thus the movement of the clutch elements will be retarded but not arrested. In prior devices for operating motor vehicle clutches, means are provided for either retarding or arresting the movement of the clutch elements substantially at the point of initial engagement, but no single prior device, so far as I am aware, is operative for performing either function, depending upon the mode of operation of the accelerator. Accordingly, where such expression as "checking the movement of the clutch elements" occurs in the claims, this expression is intended to cover either of the two conditions referred to above, namely, the retarding or arresting of the clutch elements.

The "checking" action referred to above occurs upon the relatively light contacting of the clutch elements, and under such conditions, the frictional engagement between the clutch elements is such that they can transmit substantially no relatively great degree of torque from the motor to the driving wheels. Further movement of the clutch elements beyond such point, however, causes the clutch plates to engage under greater pressure thus adapting them to transmit substantial torque. Accordingly, where the expression "operative engagement" occurs in the following claims with respect to the clutch, it is understood that such expression defines a clutch condition in which there is substantial pressure of the clutch plates so as to transmit substantial torque, as distinguished from the condition in which the clutch elements relatively lightly contact with each other.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. Clutch operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means being operative for checking the movement of the clutch elements at progressively later points in accordance with the progressively more rapid opening movement of the engine throttle.

2. Clutch operating mechanism for motor vehicles including a clutch and a throttle for the vehicle engine comprising a power device connected to the vehicle clutch, control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, and means for causing the checking of the movement of the clutch elements to occur at progressively later points in accordance with the progressively more rapid opening movement of the engine throttle.

3. Clutch operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means including a member connected to the engine throttle and movable in one direction upon closing movement of the throttle and in the other direction upon opening movement of the throttle, and a second member movable in accordance with the degree of actuation of the power device, such second member being movable in said first named direction upon the actuation of the power device and in the second named direction upon the deactuation of the power device, said second named member being movable in the last named direction into cooperative relationship with the first named member to check the releasing of the clutch elements.

4. Clutch operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means including a shiftable member, and a control member movable in one direction upon the actuation of the power device and in the other direction upon the releasing of the power device, said control member being movable in the last named direction into cooperative relationship with said shiftable member to check the releasing of the power device, and means for moving said shiftable member in the last named direction upon movement of the engine throttle, to cause the point of cooperative relationship of said members to occur progressively later in accordance with the progressively more rapid opening movement of the throttle.

5. Clutch operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means being operative for tending to disconnect the power device from the atmosphere for checking the movement of the clutch elements at progressively later points in accordance with the progressively more rapid opening movement of the engine throttle.

6. Clutch operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a pair of cooperating valves one movable in accordance with the position of the engine throttle and the other in accordance with the degree of actuation of the power device, said second named valve being biased in one direction and progressively releasable for movement in such direction upon the progressive connection of the power device with the atmosphere to tend to move into a neutral position with respect to said first named valve to disconnect the power device from the atmosphere.

7. Clutch operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a valve controlled by the engine throttle and movable in one direction upon closing movement of the throttle and in the other direction upon opening movement thereof, and a second valve movable in accordance with the degree of actuation of the power device, said second named valve being movable in said first named direction upon actuation of the power device and in the second named direction upon the connection of the power device to the atmosphere to release the power device, said second named valve being movable in the last named direction to tend to assume a neutral relationship with the first named valve to disconnect the power device from the atmosphere and check the releasing of the clutch elements.

8. Clutch operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a pair of cooperating valves, one controlled in accordance with the position of the engine throttle and the other in accordance with the degree of actuation of the power device, said first named valve being movable in one direction to connect the power device to the source of differential pressure and in the other direction to connect the power device to the atmosphere, said second named valve being movable in said first named direction upon actuation of the power device and in the second named direction upon the connection of the power device to the atmosphere, said second named valve being movable in said last named direction to tend to assume a neutral position with respect to said first named valve to disconnect the power device from the atmosphere and the source of differential pressure to check the releasing of the power device.

9. Clutch operating mechanism for motor vehicles including a clutch and a throttle for the vehicle engine comprising a power device connected to the vehicle clutch, control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means being operative for checking the movement of the clutch elements at progressively later points in accordance with the progressively more rapid opening movement of the engine throttle, and automatic means for retarding the movement of the clutch elements prior to complete engagement thereof independently of the operation of said control means.

10. Clutch operating mechanism for motor vehicles including a clutch and a throttle for the vehicle engine comprising a power device connected to the vehicle clutch, control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, means for causing the checking of the movement of the clutch elements to occur at progressively later points in accordance with the progressively more rapid opening movement of the engine throttle, and means for retarding the movement of the clutch elements prior to final engagement thereof independently of said last named means.

11. Clutch operating mechanism for motor vehicles including a clutch and a throttle for the vehicle engine comprising a power device connected to the vehicle clutch, control means operative upon movement of the engine throttle to idling position for rendering the power device operative for disengaging the clutch, and operative upon movement of the throttle toward open position for successively releasing the clutch elements for movement toward operative engagement, checking the movement of the cutch elements at a point prior to operative engagement, and then further releasing the clutch elements for movement into operative engagement, said control means including a member connected to the engine throttle and movable in one direction upon closing movement of the throttle and in the other direction upon opening movement of the throttle, and a second member movable in accordance with the degree of actuation of the power device, such second member being movable in said first named direction upon the actuation of the power device and in the second named direction upon the deactuation of the power device, said second named member being movable in the last named direction into cooperative relationship with the first named member to check the releasing of the clutch elements, and automatic means for retarding the movement of the clutch elements prior to complete engagement thereof independently of the operation of said control means.

12. Clutch operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means including a shiftable member, and a control member movable in one direction upon the actuation of the power device and in the other direction upon the releasing of the ower device, said control member being movable in the last named direction into cooperative relationship with said shiftable member to check the releasing of the power device, means for moving said shiftable member in the last named direction upon movement of the engine throttle, to cause the point of cooperative relationship of said members to occur progressively later in accordance with the progressively more rapid opening movement of the throttle, and means for automatically retarding the movement of the clutch elements prior to final engagement thereof independently of the operation of said last named means.

13. Clutch operating mechanism for motor vehicles including a clutch and a throttle for the vehicle engine comprising a pressure responsive power device connected to a motor vehicle clutch and operative for moving the clutch elements out of engagement with each other, control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means being operative for disconnecting the power device from the atmosphere for checking the movement of the clutch elements at progressively later points in accordance with the progressively more rapid opening movement of the engine throttle, and automatic means for retarding the movement of the clutch elements prior to complete engagement thereof independently of the operation of said control means.

14. Clutch operating mechanism for motor vehicles including a clutch and a throttle for the vehicle engine comprising a pressure responsive power device connected to a motor vehicle clutch and operative for moving the clutch elements out of engagement with each other, control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a valve controlled by the engine throttle and movable in one direction upon closing movement of the throttle and in the other direction upon opening movement thereof, and a second valve movable in accordance with the degree of actuation of the power device, said second named valve being movable in said first named direction upon actuation of the power device and in the second named direction upon the connection of the power device to the atmosphere to release the power device, said second named valve being movable in the last named direction into cooperative relationship with the first named valve to disconnect the power device from the atmosphere and check the releasing of the clutch elements, and automatic means for retarding the movement of the clutch elements prior to complete engagement thereof independently of the operation of said control means.

15. Clutch operating mechanism for motor vehicles including a clutch and a throttle for the vehicle engine comprising a pressure responsive power device connected to a motor vehicle clutch and operative for moving the clutch elements out of engagement with each other, control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a pair of cooperating valves, one controlled in accordance with the position of the engine throttle and the other in accordance with the degree of actuation of the power device, said first named valve being movable in one direction to connect the power device to the source of differential pressure and in the other direction to connect the power device to the atmosphere, said second named valve being movable in said first named direction upon actuation of the power device and in the second named direction upon the connection of the power device to the atmosphere, said second named valve being movable in said last named direction to assume a neutral position with respect to said first named valve to disconnect the power device from the atmosphere and the source of differential pressure to check the releasing of the power device, and means for automatically retarding the movement of the clutch elements prior to final engagement thereof independently of said valves.

16. Clutch operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means being operative through a range of movement of the engine throttle adjacent the idling position thereof for releasing the pressure of the clutch plates substantially in proportion to the engine torque.

17. Clutch operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means including a member connected to the engine throttle and movable in one direction upon closing movement of the throttle and in the other direction upon opening movement of the throttle, and a second member movable in accordance with the degree of actuation of the power device, such second member being movable in said first named direction upon the actuation of the power device and in the second named direction upon the deactuation of the power device, said members being movable in cooperative relationship through a range of movement of the engine throttle adjacent the idling position thereof for releasing the pressure of the clutch plates substantially in proportion to the engine torque.

18. Clutch operating mechanism for motor vehicles including a clutch and a throttle for the vehicle engine comprising a power device connected to the vehicle clutch, and control means operative upon movement of the engine throttle to idling position for rendering the power device operative for disengaging the clutch, and operative upon movement of the throttle toward open position for successively releasing the clutch elements for movement toward operative engagement, checking the movement of the clutch elements at a point prior to operative engagement, and then further releasing the clutch elements for movement into operative engagement, said control means including a shiftable member, and a control member movable in one direction upon the actuation of the power device and in the other direction upon the releasing of the power device, said control member being movable in the last named direction into cooperative relationship with said shiftable member to check the releasing of the power device, and means for moving said shiftable member in the last named direction upon movement of the engine throttle, said members being movable in cooperative relationship through a range of movement of the engine throttle adjacent the idling position thereof for releasing the pressure of the clutch plates substantially in proportion to the engine torque.

19. Clutch operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means being operative during a range of movement of the engine throttle adjacent the idling position thereof for varying the pressure in said power device to release the pressure of the clutch plates substantially in proportion to the engine torque.

20. Clutch operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a valve controlled by the engine throttle and movable in one direction upon closing movement of the throttle and in the other direction upon opening movement thereof, and a second valve movable in accordance with the degree of actuation of the power device, said second named valve being movable in said first named direction upon actuation of the power device and in the second named direction upon the connection of the power device to the atmosphere to release the power device, said valves cooperating with each other through a range of movement of the engine throttle adjacent to the idling position thereof for varying the pressure in said power device to release the pressure of the clutch plates substantially in proportion to the engine torque.

21. Clutch operating mechanism for motor vehicles including a clutch and a throttle for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle to idling position for connecting the power device to the source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a pair of cooperating valves, one controlled in accordance with the position of the engine throttle and the other in accordance with the degree of actuation of the power device, said first named valve being movable in one direction to connect the power device to the source of differential pressure and in the other direction to connect the power device to the atmosphere, said second named valve being movable in said first named direction upon actuation of the power device and in the second named direction upon the connection of the power device to the atmosphere, said valves cooperating with each other through a range of movement of the engine throttle adjacent to the idling position thereof for varying the pressure in said power device to release the pressure of the clutch plates substantially in proportion to the engine torque.

22. Clutch operating mechanism for motor vehicles including a clutch and a throttle for the vehicle engine comprising a vacuum operated power device connected to the vehicle clutch, a valve casing having a port communicating with said power device and being provided with ports communicating respectively with the intake manifold of the vehicle engine and the atmosphere, a pair of valves relatively slidable in said valve casing and each provided with a pair of ports operative for establishing communication between said first named port and either of said other ports, the remote limits of the ports of one valve being spaced apart a distance substantially equal to the distance between the adjacent limits of the other valve, means for moving one of said valves in one direction upon closing movement of the engine throttle and in the other direction upon opening movement of the throttle, and means responsive to pressure in said power device for moving the other valve in the first named direction upon actuation of the power device and in the second named direction upon a reduction in pressure in the power device.

23. Clutch operating mechanism for motor vehicles including a clutch and a throttle for the vehicle engine comprising a vacuum operated power device connected to the vehicle clutch, a valve casing having a port communicating with said power device and being provided with ports communicating respectively with the intake manifold of the vehicle engine and the atmosphere, a pair of valves relatively slidable in said valve casing and each provided with a pair of ports operative for establishing communication between said first named port and either of said other ports, the remote limits of the ports of one valve being spaced apart a distance substantially equal to the distance between the adjacent limits of the other valve, means for moving one of said valves in one direction upon closing movement of the engine throttle and in the other direction upon opening movement of the throttle, means responsive to pressure in said power device for moving the other valve in the first named direction upon actuation of the power device and in the second named direction upon a reduction in pressure in the power device, a valve controlling communication through said atmospheric port and biased toward closed position to restrict communication through said atmospheric port, and means responsive to pressure in said power device for maintaining said last named valve in open position when the pressure in said power device is slightly below that of the atmosphere.

EDWARD G. HILL.

DISCLAIMER 1,964,693.—*Edward G. Hill*, Chicago, Ill. MOTOR VEHICLE CLUTCH CONTROL MECHANISM. Patent dated June 26, 1934. Disclaimer filed December 16, 1938, by the assignee, *Hill Engineering Corporation*.

Hereby enters its disclaimer to claims 1, 2, 3, 4, 5, 6, 7, 16, 17, 18, 19, 20, and 21 in said specification.

[*Official Gazette January 10, 1939.*]

source of differential pressure to disengage the clutch, and operative upon movement of the throttle toward open position for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a pair of cooperating valves, one controlled in accordance with the position of the engine throttle and the other in accordance with the degree of actuation of the power device, said first named valve being movable in one direction to connect the power device to the source of differential pressure and in the other direction to connect the power device to the atmosphere, said second named valve being movable in said first named direction upon actuation of the power device and in the second named direction upon the connection of the power device to the atmosphere, said valves cooperating with each other through a range of movement of the engine throttle adjacent to the idling position thereof for varying the pressure in said power device to release the pressure of the clutch plates substantially in proportion to the engine torque.

22. Clutch operating mechanism for motor vehicles including a clutch and a throttle for the vehicle engine comprising a vacuum operated power device connected to the vehicle clutch, a valve casing having a port communicating with said power device and being provided with ports communicating respectively with the intake manifold of the vehicle engine and the atmosphere, a pair of valves relatively slidable in said valve casing and each provided with a pair of ports operative for establishing communication between said first named port and either of said other ports, the remote limits of the ports of one valve being spaced apart a distance substantially equal to the distance between the adjacent limits of the other valve, means for moving one of said valves in one direction upon closing movement of the engine throttle and in the other direction upon opening movement of the throttle, and means responsive to pressure in said power device for moving the other valve in the first named direction upon actuation of the power device and in the second named direction upon a reduction in pressure in the power device.

23. Clutch operating mechanism for motor vehicles including a clutch and a throttle for the vehicle engine comprising a vacuum operated power device connected to the vehicle clutch, a valve casing having a port communicating with said power device and being provided with ports communicating respectively with the intake manifold of the vehicle engine and the atmosphere, a pair of valves relatively slidable in said valve casing and each provided with a pair of ports operative for establishing communication between said first named port and either of said other ports, the remote limits of the ports of one valve being spaced apart a distance substantially equal to the distance between the adjacent limits of the other valve, means for moving one of said valves in one direction upon closing movement of the engine throttle and in the other direction upon opening movement of the throttle, means responsive to pressure in said power device for moving the other valve in the first named direction upon actuation of the power device and in the second named direction upon a reduction in pressure in the power device, a valve controlling communication through said atmospheric port and biased toward closed position to restrict communication through said atmospheric port, and means responsive to pressure in said power device for maintaining said last named valve in open position when the pressure in said power device is slightly below that of the atmosphere.

EDWARD G. HILL.

DISCLAIMER 1,964,693.—*Edward G. Hill*, Chicago, Ill. MOTOR VEHICLE CLUTCH CONTROL MECHANISM. Patent dated June 26, 1934. Disclaimer filed December 16, 1938, by the assignee, *Hill Engineering Corporation*.

Hereby enters its disclaimer to claims 1, 2, 3, 4, 5, 6, 7, 16, 17, 18, 19, 20, and 21 in said specification.

[*Official Gazette January 10, 1939.*]